United States Patent
Torin et al.

(10) Patent No.: US 9,197,455 B2
(45) Date of Patent: Nov. 24, 2015

(54) TWO STAGE ADAPTIVE EQUALIZER FOR A BATCH RECEIVER

(75) Inventors: Shigetsune Torin, Beaverton, OR (US); Thomas L. Kuntz, Portland, OR (US)

(73) Assignee: TEKTRONIX, INC., Beaverton, OR (US)

( * ) Notice: Subject to any disclaimer, the term of this patent is extended or adjusted under 35 U.S.C. 154(b) by 541 days.

(21) Appl. No.: 13/208,559

(22) Filed: Aug. 12, 2011

(65) Prior Publication Data
US 2013/0039406 A1 Feb. 14, 2013

(51) Int. Cl.
*H04L 27/01* (2006.01)
*H04L 25/03* (2006.01)

(52) U.S. Cl.
CPC . *H04L 25/03057* (2013.01); *H04L 2025/03484* (2013.01); *H04L 2025/03605* (2013.01); *H04L 2025/03668* (2013.01)

(58) Field of Classification Search
CPC ........... H04L 2025/03433; H04L 2025/03484; H04L 2025/0349; H04L 2025/03496; H04L 2025/03503; H04L 2025/03592; H04L 2025/03605; H04L 2025/03598; H04L 2025/03611; H04L 25/03057; H04L 2025/03668
USPC .................................................. 375/229–334
See application file for complete search history.

(56) References Cited

U.S. PATENT DOCUMENTS

| | | | |
|---|---|---|---|
| 6,628,707 B2 * | 9/2003 | Rafie et al. | 375/233 |
| 6,671,334 B1 * | 12/2003 | Kuntz et al. | 375/340 |
| 2002/0021750 A1 * | 2/2002 | Belotserkovsky et al. | 375/232 |

* cited by examiner

*Primary Examiner* — Sophia Vlahos
(74) *Attorney, Agent, or Firm* — Michael A. Nelson; Marger Johnson

(57) ABSTRACT

A two stage adaptive filter for use in a batch receiver includes an equalizer filter having as inputs an acquired signal representing a batch of data points and an equalizer filter value. The filtered signal is batch processed to produce reference and data symbols, which symbols are input to a residual filter to generate iteratively over the batch an error value. The error value is convolved with the equalizer filter value to produce a new equalizer filter value for use by the equalizer filter when a next batch of data points is processed.

13 Claims, 7 Drawing Sheets

TWO STAGE ADAPTIVE EQUALIZER FOR A BATCH RECEIVER

BACKGROUND OF THE INVENTION

The present invention relates to compensation of an unknown channel for a receiver, and more particularly to a two stage adaptive equalizer that provides an efficient algorithm for a batch receiver.

A conventional adaptive equalizer is good for compensating for an unknown channel for a stream type receiver, i.e., a receiver where each received data point or symbol is processed sequentially. The conventional adaptive equalizer can update an equalizing filter symbol by symbol. However a batch receiver stores a certain time interval of received data points or symbols in memory before processing the symbols. If an adaptive equalizer is placed before a batch receiver, the adaptive equalizer is updated once per batch processing, i.e., time interval. This is inefficient. Alternatively updating the adaptive equalizer for every symbol in memory may be possible, but it requires the entire batch processing time for each symbol. This is too time consuming and impractical.

Speed of equalizer convergence for an adaptive equalizer is almost always a concern. The conventional adaptive equalizer is designed for stream receivers, as shown in FIG. 1. A transmitter provides a signal that passes through an unknown channel and is then sampled at the input of the stream receiver. A post signal processing block performs signal corrections, such as timing and phase adjustments.

An example of a batch receiver is a modulation analysis system found in a Real Time Spectrum Analyzer (RTSA), such as those manufactured by Tektronix, Inc. of Beaverton, Oreg. The entire batch processing is used to demodulate and analyze the received signals. Many times it is desired to add an adaptive equalizer to the batch receiver without modifying the batch processing block. A typical configuration for a batch receiver without an adaptive equalizer is shown in FIG. 2 where the data points output from the sampler are stored in a memory. However, to provide for adaptive equalization in this situation, as shown in FIG. 3, the adaptive equalizer is placed after the memory, but before the batch processing. Symbol by symbol adaptation is not practical, and batch by batch adaptation needs to be used. A problem with this equalization system using a conventional adaptive equalizer is slow convergence because the filter taps are updated only once per batch based upon a single data symbol from the batch receiver output.

The response of the unknown channel is h, and the adaptation algorithm tries to find equalizing filter, g, so that $h*g=\delta$, where $\delta$ is a Kronecker delta or impulse sequence in discrete time and * indicates convolution. Although the adaptation is not perfect, eventually the adaptation is close enough to hold the equation after a certain number of iterations. However the conventional adaptive equalizer shown in FIG. 4, when applied in a batch receiver, takes time to converge because the update rate is much less than in the stream receiver shown in FIG. 1.

What is desired is a adaptive equalizer for a batch receiver that achieves a faster equalizer convergence than a conventional adaptive equalizer.

BRIEF SUMMARY OF THE INVENTION

Accordingly, the present invention provides a two stage adaptive equalizer for a batch receiver that processes each batch of acquired data or symbols via a conventional equalizer filter prior to the batch processing. The batch processing outputs reference symbols and a partial set of data symbols each symbol interval starting from an initial training location in both a symbol and a reference memory to an ending training location. A residual filter receives the reference symbols and partial sets of data symbols and iteratively produces a residual error for the batch of symbols being processed. The resulting residual error is applied to the equalizer filter in a conventional manner to update the equalizer filter each batch cycle. The process repeats for each batch of data that is processed to further refine the equalizer filter.

The objects, advantages and other novel features of the present invention are apparent from the following detailed description when read in conjunction with the appended claims and attached drawing figures.

DETAILED DESCRIPTION OF THE INVENTION

Figure 5:
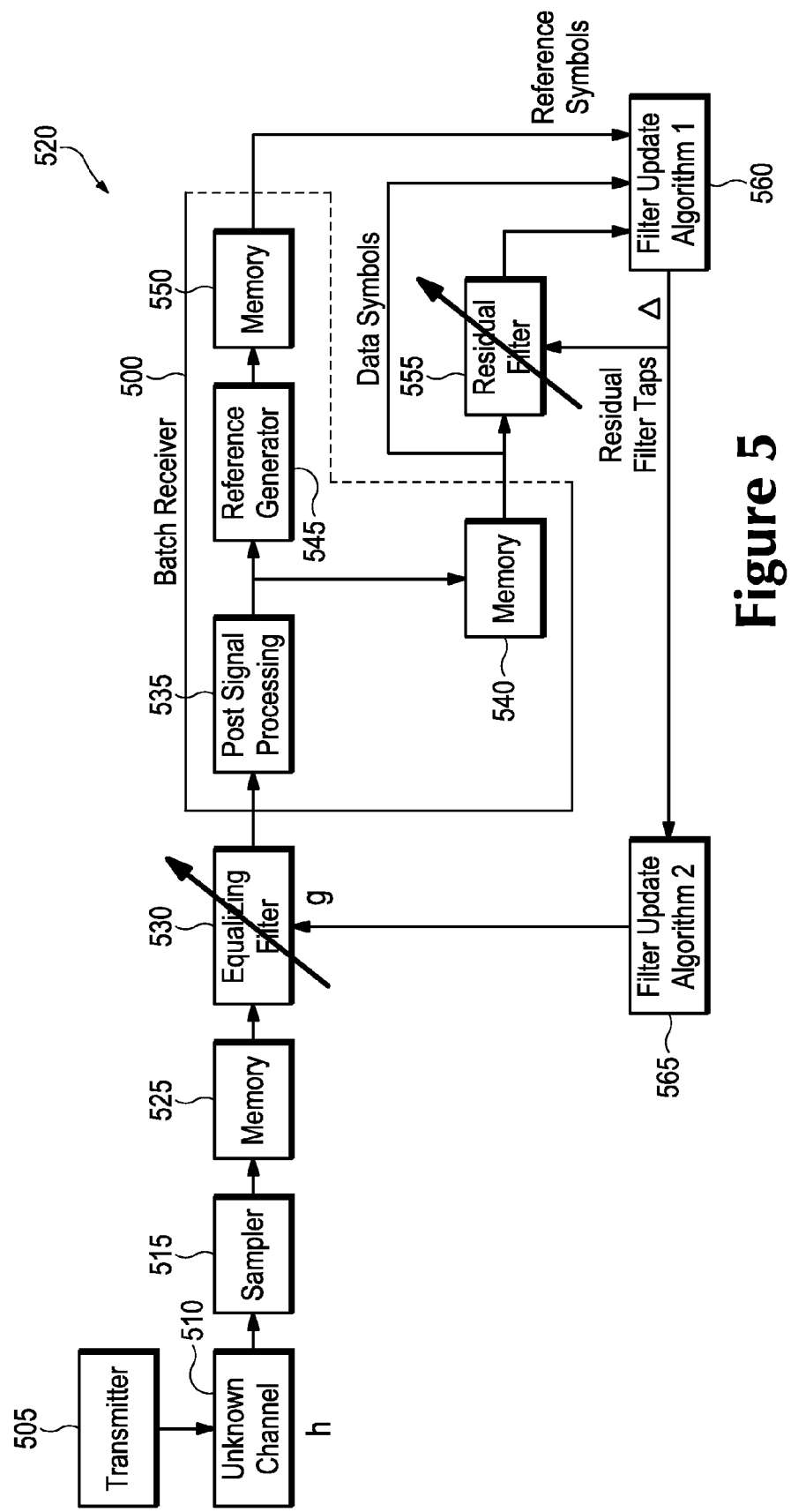
FIG. 5 is a block diagram view of a two state adaptive equalizer in a batch receiver according to the present invention.

Referring now to FIG. 5 a transmitter 505 provides a signal through an unknown channel 510 to a sampler 515 at the input of a batch receiver 520. The data points or symbols from the sampler 515 are input to an acquisition memory 525. When batch processing occurs, the symbols from the acquisition memory 525 are input to an equalizing filter 530, the output of which is input to a post signal processing module 535. The output from the post signal processing module 535 is in the form of data symbols which are input to a data memory 540 and a reference generator 545. The reference generator 545 produces reference symbols, i.e., ideal symbols, which are stored in a reference memory 550. Alternatively, if the symbol or data pattern is known, the reference generator 545 may be pre-loaded with the reference symbols or data. The data symbols from the data memory 540 are input to a residual filter 555 and to a first filter update algorithm 560. Also input to the first filter update algorithm 560 are the data symbols from the data memory 540 and the reference symbols from the reference memory 550. The first filter update algorithm 560 produces a residual error, $\Delta$, that is applied to filter taps of the residual filter 555. At the completion of the batch processing, the resulting residual error also is applied to a second filter update algorithm 565 which provides a correction input to the equalizing filter 530.

The key idea is to try to estimate the resulting residual error, Δ, from the data and reference symbols during the batch processing, instead of directly estimating the equalizing filter value, g. Then batch by batch update of the equalizing filter 530 becomes g*Δ→g. Δ→δ as batch iterations increase.

Figure 6:
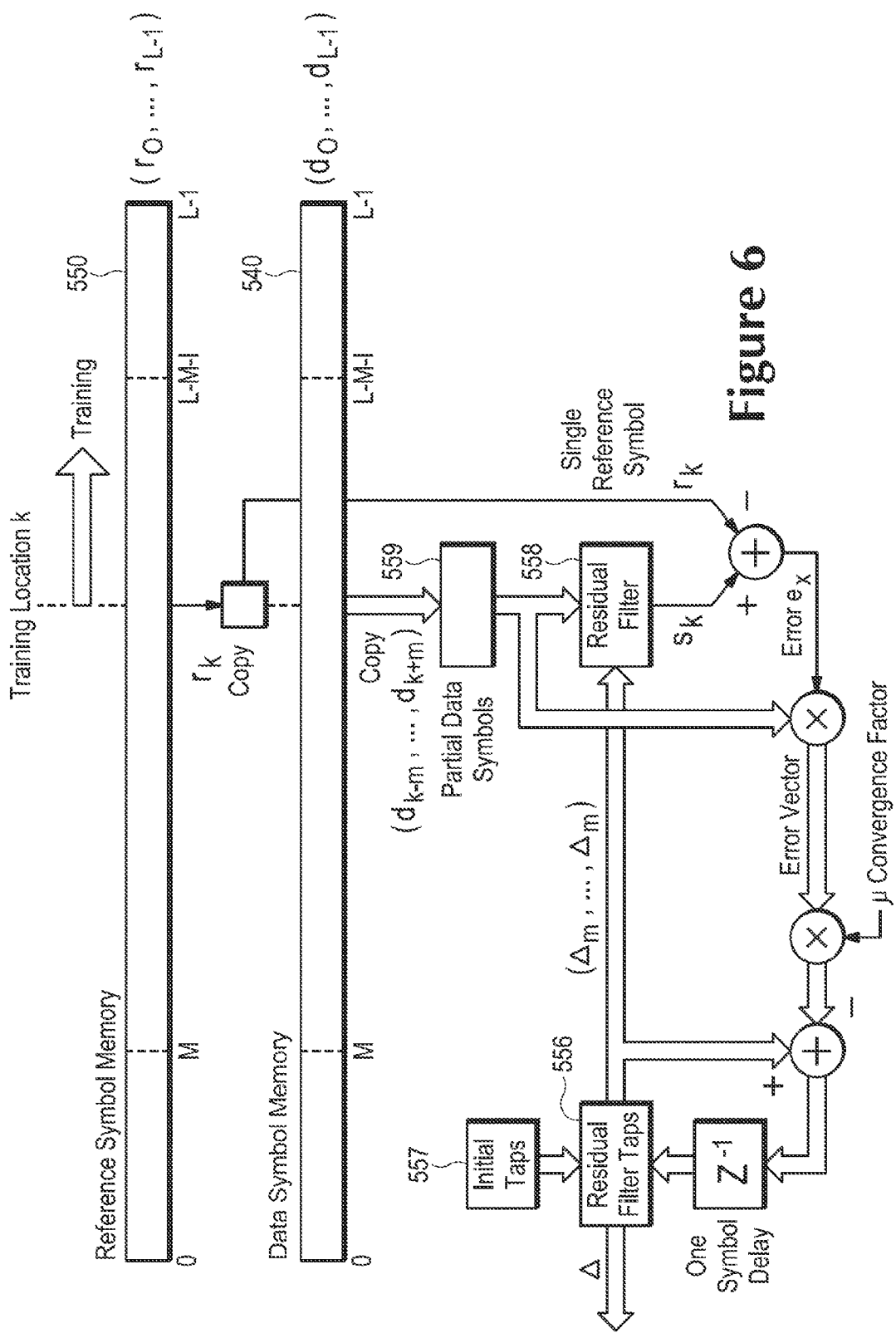
FIG. 6 is a block diagram view of a residual filter for the two stage adaptive equalizer according to the present invention.

An adaptive algorithm may be used to train the residual filter taps. An example of the first filter update algorithm 560 is shown in FIG. 6. This example uses a least mean squares (LMS) algorithm. The single lines show scalar values and the double lines show vector values whose size is the same as the size of the residual filter 558 (see FIG. 6). At the beginning of training in each batch, the residual filter taps start from initial taps, δ.

As shown in FIG. 6, the length of both the data and reference memories 540, 550 is L. The length of the residual filter taps 556 is 2m+1. Then the training location, k, starts from m and stops at L−m−1. With initial taps 557 for the residual filter 558 being the residual error $\Delta=(\Delta_{-m}, \ldots, \Delta_m)$, then $\Delta_n=0, n\neq 0$; 1, n=0. Initial partial data symbols 559, i.e., a subset of the symbols in the batch, are $(d_0+ \ldots +d_{2m})$, or in general form $(d_{k-m}+ \ldots +d_{k+m})$. The operation of the residual filter 558 produces a scalar output, $s_k$, as $$s_k=\Delta_{-m}d_{k+m}+\Delta_{-m+1}d_{k+m-1}+\ldots+\Delta_m d_{k-m}=\Sigma_{n=-m\to m}\Delta_n d_{k-n}$$

Figures 1, 2:
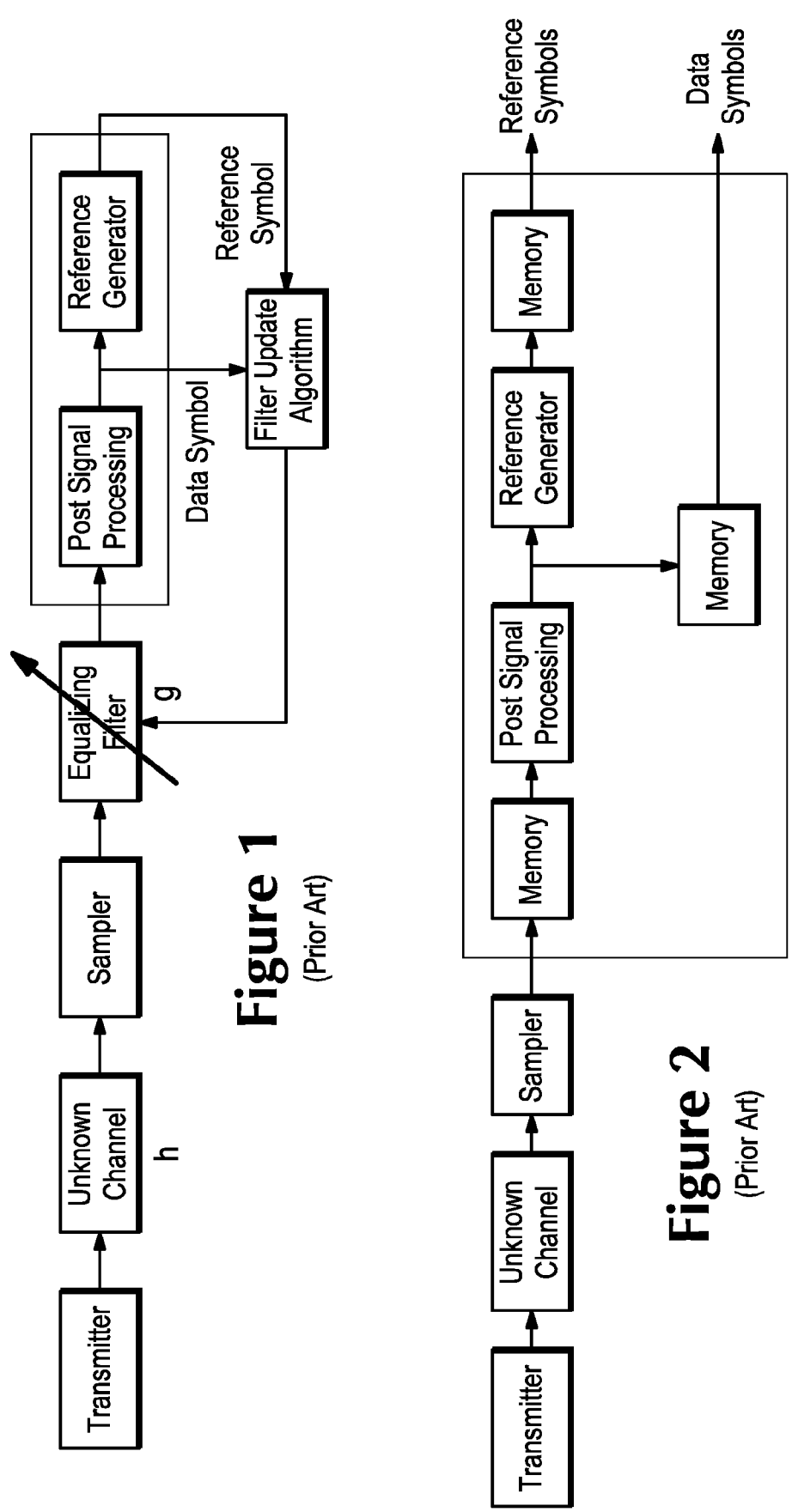
FIG. 1 is a block diagram view of a stream receiver using an adaptive equalizer according to the prior art.
FIG. 2 is a block diagram view of a batch receiver according to the prior art.
Figure 3:
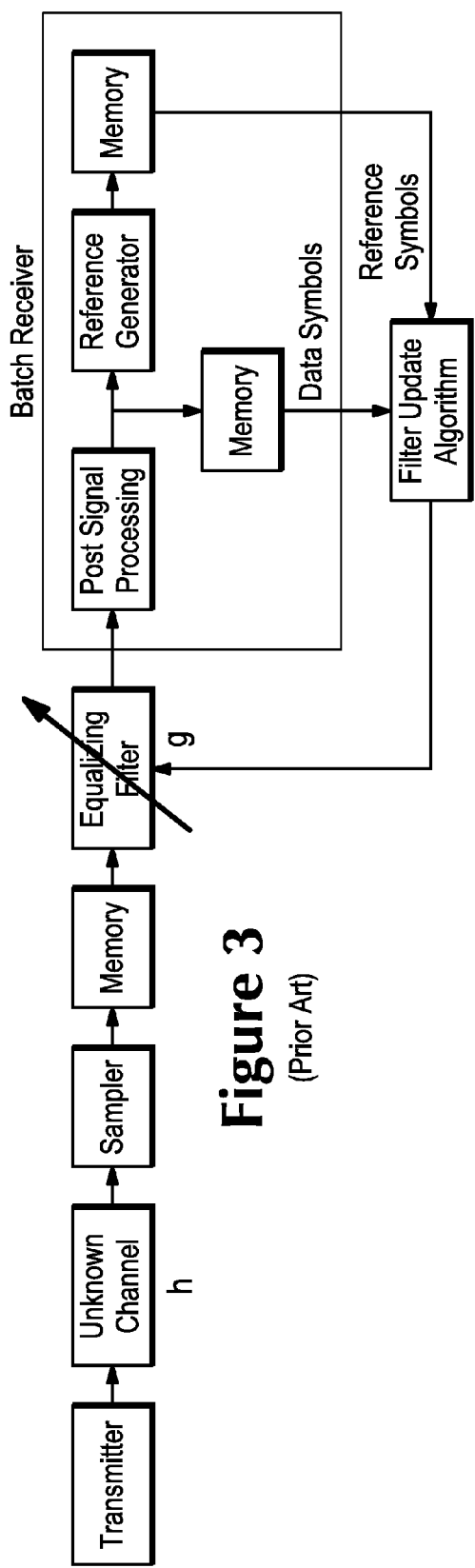
FIG. 3 is a block diagram view of a batch receiver using a conventional adaptive equalizer according to the prior art.
Figure 4:
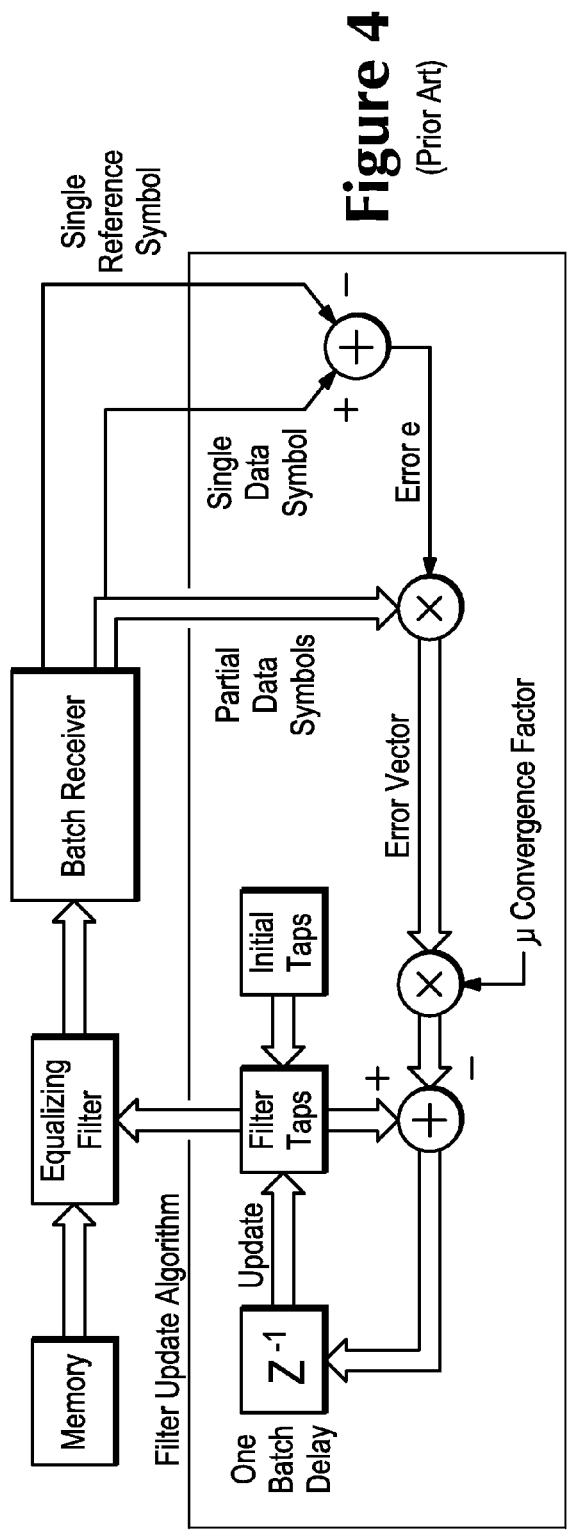
FIG. 4 is a block diagram view of the conventional adaptive equalizer in a batch receiver according to the prior art.

The error for position k is calculated as $e_k=s_k-r_k$. The error vector is ErrorVector$=e_k(d_{k-m}+ \ldots +d_{k+m})$. The next filter tap is $\Delta'=\Delta-\mu e_k(d_{k-m}, \ldots, d_{k+m})$, where μ is a convergence factor. Then the next training position is k'=k+1. For each set of partial data symbols, one of the symbols is essentially compared to a corresponding reference symbol. The training position increments one symbol at a time from an initial position to an ending position through the batch processing. The first update algorithm 560 is similar to that shown in FIG. 4.

Figure 7:
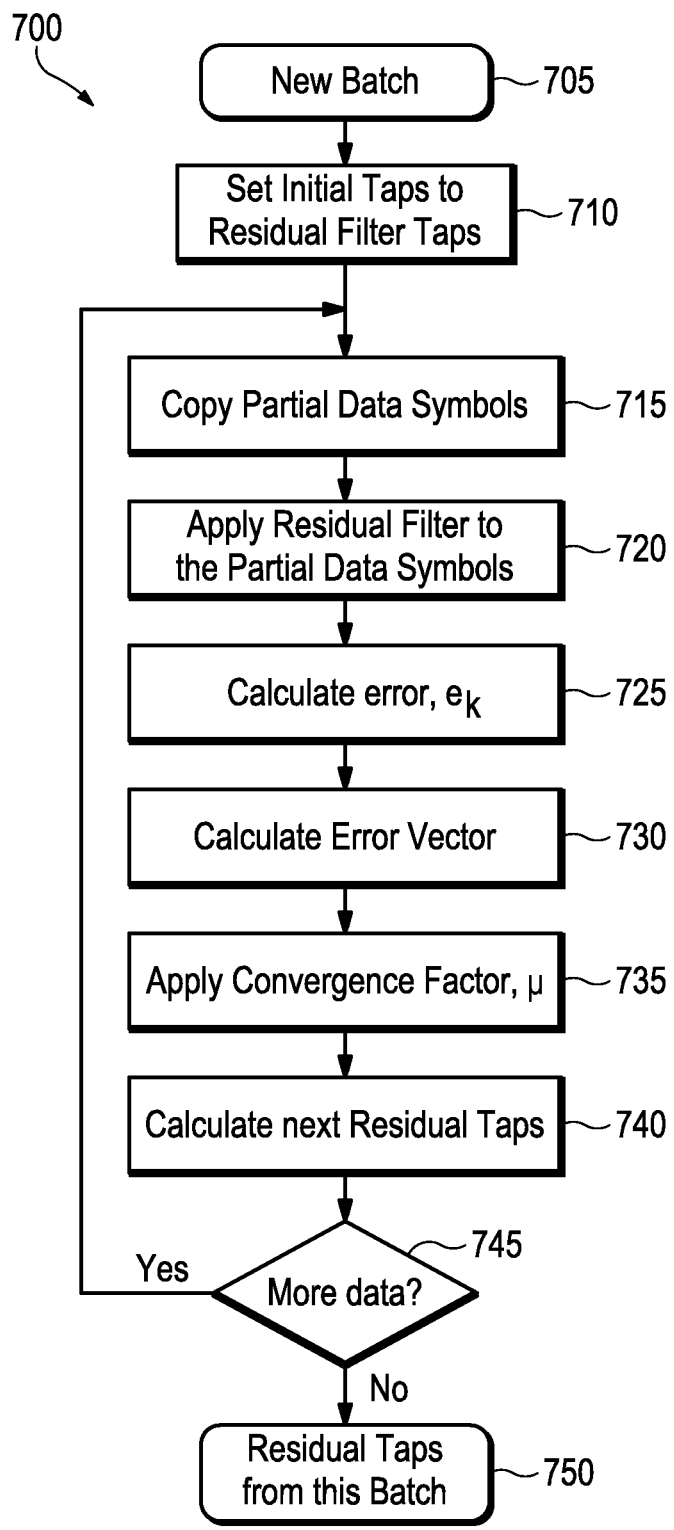
FIG. 7 is a flow diagram view for the residual filter of FIG. 6 according to the present invention.

The above is described in the flow diagram of FIG. 7. For each new batch process 705 the residual filter taps 556 are set to the initial taps 557. Then a partial set of data symbols is copied (step 715) from the data memory 540 and input to the residual filter 558 (step 720). The error value between one of the symbols of the partial set and the corresponding reference value from the reference memory 550 is calculated (step 725). In step 730 the Error Vector is calculated by multiplying the partial data symbols with the error value, and in step 735 the convergence factor is applied to produce a modified Error Vector. From the prior values of the residual filter taps 556 and the modified Error Vector a new set of values for the residual filter taps are calculated (step 740). If there is more data to be processed in the batch, i.e., the training location has not reached its end limit, at step 745 the training location is incremented and the process repeats. If there is no more data in the batch, i.e., the training location has reached its end limit, then the final residual tap delta is accepted (step 750) for input to the second filter update algorithm 565.

Figure 8:
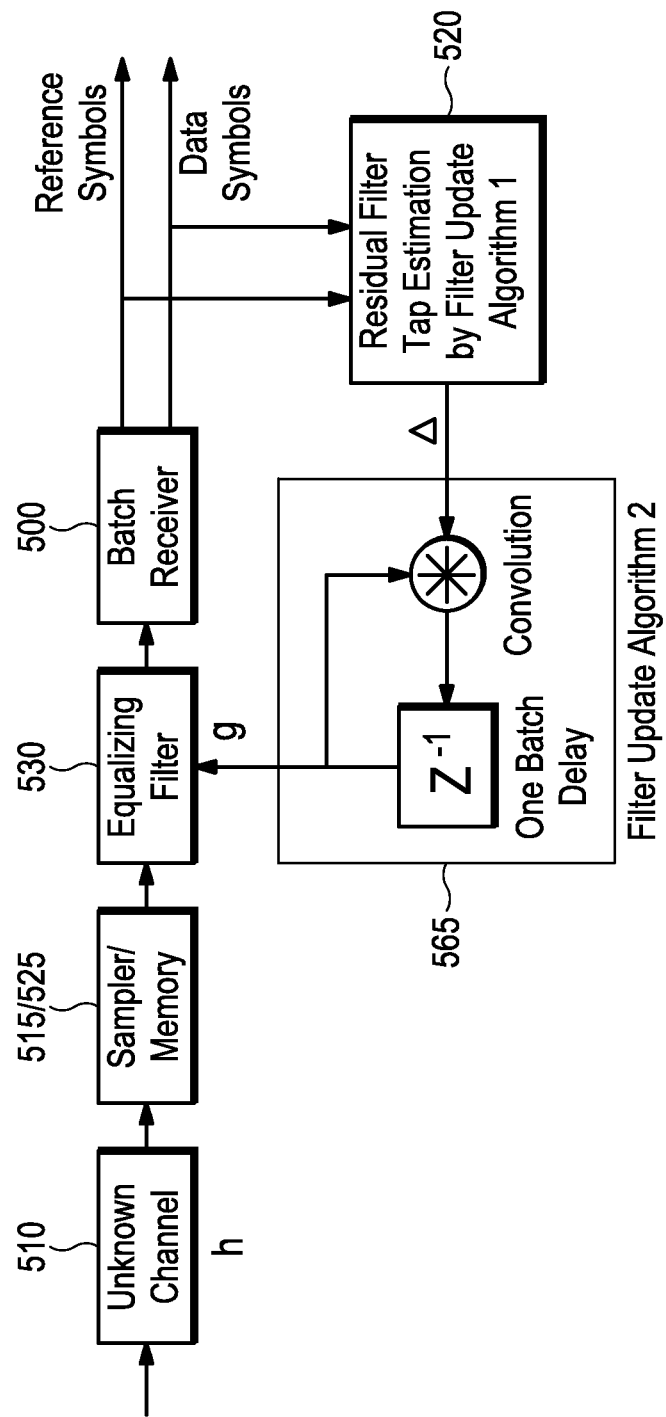
FIG. 8 is a block diagram view for a batch equalizer filter for the two stage adaptive equalizer according to the present invention.

FIG. 8 shows that the residual filter tap estimation from the first filter update algorithm is convolved with the equalizing filter value, g, with a one batch delay, as in a conventional adaptive equalizer.

Figure 9:
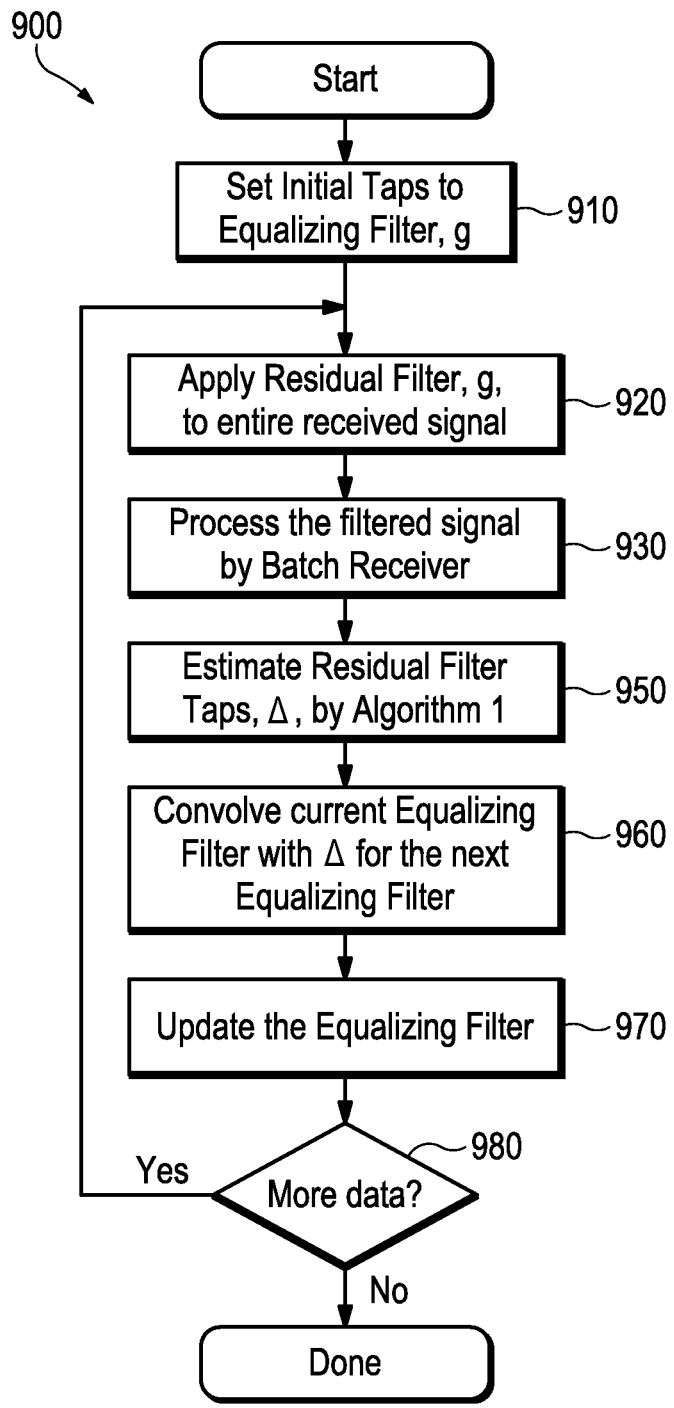
FIG. 9 is a flow diagram view for the batch equalizer filter of FIG. 8 according to the present invention.

FIG. 9 shows a general flowchart for the entire two stage adaptive equalizer. The taps of the equalizing filter 530 are set to initial tap values (step 910). Then the equalizing filter 530 is applied to the entire received signal (step 920), and the filtered signal is processed by the batch receiver (step 930). In step 950 the residual filter taps are calculated for the filtered signal, as shown in FIGS. 6 and 7. Then the equalizing filter g is convolved with the Δ from the residual filter taps (step 960), and the equalizing filter is updated (step 970). If an additional batch of data is acquired, or if it is desired to reprocess the current batch, a decision (step 980) is made to reiterate the process by returning to step 920.

Although the above discussion deals with symbols generally, the processing may be done on fractional symbols or data points. In other words, the elements of the data and reference memories 540, 550 may be sub-samples where the data or reference symbols are sampled at half, a quarter, etc. of the symbol period.

Thus the present invention provides a two stage adaptive filter for a batch receiver by processing sets of partial symbols in the batch over an iterative process in a first update algorithm to generate a residual error value, which is then used to adjust an equalizer filter once each batch in a second update algorithm.

What is claimed is:

1. A two stage adaptive equalizer for a batch receiver comprising:
   an equalizer filter having as inputs an acquired signal in the form of a batch of data points and an initial equalizing filter value, and having as an output a filtered signal;
   a batch processor having as an input the filtered signal, and having as outputs processed data points;
   a residual filter having as inputs the processed data points and a residual error value for the batch, and having as an output a residual filter value;
   a first filter update unit having as inputs the residual filter value, the processed data points and reference data points corresponding to the processed data points, and having as an output the residual error value for the batch; and
   a second filter update unit configured to combine the residual error value and the initial equalizing filter value to generate a new equalizing filter value for the equalizer filter as the initial equalizing filter value for a new batch of data points.

2. The two stage adaptive equalizer as recited in claim 1 wherein the data points comprise symbols.

3. The two stage adaptive equalizer as recited in claim 1 wherein the data points comprise sub-samples of symbols.

4. The two stage adaptive equalizer as recited in claim 1 wherein the batch processor further comprises:
   a data memory configured to store the process data points prior to input to the residual filter; and
   a reference memory configured to store the reference data points.

5. The two stage equalizer as recited in claim 4 wherein the batch processor further comprises means for generating the reference data points from the processed data points, which reference data points are stored in the reference memory prior to input to the residual filter.

6. The two stage equalizer as recited in claim 4 wherein the reference memory contains a pre-loaded set of reference data points when a pattern for the processed data points is known.

7. A method of adaptive equalization for a batch receiver comprising the steps of:
   filtering a plurality of portions of a batch of data points using an equalizer filter having an initial equalizing filter value during batch processing to produce a plurality of portions of processed data points;
   comparing each portion of the processed data points with corresponding reference data points during batch processing to produce an error value for each portion of the batch based on the comparison and a residual filter value;
   adjusting a residual filter value of a residual filter each time the error value is produced for each portion of the batch;

generating a residual error value for the batch based on a comparison of a final portion of the processed data points and its corresponding reference data points of the batch; and adjusting the initial equalizing filter value based upon the residual error value of the batch to produce an adjusted equalizing filter value as the initial equalizing filter value for a new batch of data points.

8. The method as recited in claim 7 wherein the data points comprise symbols.

9. The method as recited in claim 7 wherein the data points comprise sub-samples of symbols.

10. The method as recited in claim 7 further comprising the steps of:

storing the processed data points in a data memory prior to the comparing step; and storing the reference data points in a reference memory.

11. The method as recited in claim 10 further comprising the step of generating the reference data points from the processed data points during the batch processing prior to the comparing step.

12. The method as recited in claim 10 further comprising pre-loading the reference data points in the reference memory when a pattern of the processed data points is known.

13. The two stage adaptive equalizer as recited in claim 1 wherein the residual filter and the first filter update unit continually output filtered processed data points and an error value for each portion of portions of the batch during batch processing and, at the completion of batch processing, sending the residual error value to the second filter update unit.

* * * * *

UNITED STATES PATENT AND TRADEMARK OFFICE
CERTIFICATE OF CORRECTION

| | | |
|---|---|---|
| PATENT NO. | : 9,197,455 B2 | Page 1 of 1 |
| APPLICATION NO. | : 13/208559 | |
| DATED | : November 24, 2015 | |
| INVENTOR(S) | : Shigetsune Torin et al. | |

It is certified that error appears in the above-identified patent and that said Letters Patent is hereby corrected as shown below:

IN THE SPECIFICATION

In column 4, line 64-65, delete "and a residual filter value"

Signed and Sealed this
Sixteenth Day of February, 2016

Michelle K. Lee
*Director of the United States Patent and Trademark Office*